(12) United States Patent
Dewinter

(10) Patent No.: US 6,945,686 B2
(45) Date of Patent: Sep. 20, 2005

(54) METHOD FOR DOSING REINFORCING FIBRES FOR THE MANUFACTURING OF FIBRE CONCRETE AND THE CHAIN PACKING USED

(75) Inventor: Ronny Dewinter, Kuurne (BE)

(73) Assignee: NV Bekaert SA, Zwevegen (BE)

( * ) Notice: Subject to any disclaimer, the term of this patent is extended or adjusted under 35 U.S.C. 154(b) by 0 days.

(21) Appl. No.: 10/687,974

(22) Filed: Oct. 20, 2003

(65) Prior Publication Data
US 2004/0109384 A1 Jun. 10, 2004

Related U.S. Application Data

(63) Continuation of application No. PCT/EP02/04566, filed on Apr. 24, 2002.

(30) Foreign Application Priority Data
May 4, 2001 (BE) .......................................... 2001/0309

(51) Int. Cl.⁷ .......................... B01F 15/02; B01F 13/10; B26D 7/06; B28C 7/04
(52) U.S. Cl. .......................... 366/8; 366/16; 366/153.3; 53/492
(58) Field of Search ................................ 366/6, 10, 16, 366/27, 150.1, 150.3, 153.3, 8; 414/412; 83/23, 370; 221/1, 30; 222/1, 80

(56) References Cited

U.S. PATENT DOCUMENTS

| | | | |
|---|---|---|---|
| 1,916,531 A | 10/1933 | Robb | .......................... 414/412 |
| 3,199,671 A | 8/1965 | Davy | .......................... 206/503 |
| 3,813,848 A | 6/1974 | Romagnoli | .................. 53/546 |
| 4,119,227 A | * 10/1978 | Hafner et al. | ................ 414/412 |

(Continued)

FOREIGN PATENT DOCUMENTS

| | | | | |
|---|---|---|---|---|
| BE | 1009507 A3 | 4/1997 | | |
| DE | 3412216 A1 | 10/1985 | | |
| DE | 4427156 A1 | 2/1996 | | |
| DE | 29714704 U1 | 11/1997 | | |
| DE | 19911426 A1 | 2/2000 | | |
| EP | 0 499 572 A1 | 8/1992 | .................... | 366/8 |
| EP | 0 499 573 A1 | 8/1992 | .................. | 366/16 |
| FR | 2672045 A1 | 7/1992 | | |
| WO | 91/14551 | 10/1991 | | |
| WO | 96/02715 | 2/1996 | | |
| WO | 01/81265 | 11/2001 | | |

OTHER PUBLICATIONS

International Search Report for application no. PCT/EP02/04566 To N.V. Bekaert S.A. et al., filed Apr. 24, 2002, dated Sep. 30, 2002 (3 pages).

International Search Report for application no. PCT/EP02/02455 To N.V. Bekaert S.A. et al., filed Mar. 5, 2002, dated Jul. 26, 2002 (3 pages).

International Search Report for PCT/EP02/04566, filed Apr. 24, 2002, Report dated Sep. 30, 2002, (3 pages).

Patent Abstract of Japan, public. date Oct. 31, 2000, public. no. 2000302493 for application no. 11104089 to Shimizu Corp., filed Apr. 12, 1999, (1 page).

2244 Research Disclosure (1995) Jan., No. 369 Emsworth, GB, 36924, entitled: Water–Soluble Bags For Containing Reinforcing Steel Fibres, Disclosed anonymously, (1 page).

*Primary Examiner*—Tony G. Soohoo
(74) *Attorney, Agent, or Firm*—Shlesinger, Arkwright & Garvey LLP

(57) ABSTRACT

A method for dosing reinforcing fibers in a mixing silo during the manufacture of fiber concrete. The reinforcing fibers as supplied in a chain packing of sacks. The sacks may be made of material which can be disintegrated in mortar or concrete. The chain packing including sacks filled with reinforcing fibers for carrying out the method may be made of material which can be disintegrated in mortar or concrete.

5 Claims, 3 Drawing Sheets

U.S. PATENT DOCUMENTS

| | | | |
|---|---|---|---|
| 4,798,508 A | * | 1/1989 | Lewis ......................... 414/412 |
| 4,946,339 A | * | 8/1990 | Berg et al. .................. 414/412 |
| 5,224,595 A | | 7/1993 | Sugimoto et al. ........... 206/321 |
| 5,224,774 A | | 7/1993 | Valle et al. .................... 366/2 |
| 5,285,930 A | * | 2/1994 | Nielsen ......................... 222/1 |
| 5,807,458 A | | 9/1998 | Sanders et al. .............. 156/276 |
| 6,197,423 B1 | | 3/2001 | Rieder et al. ................ 428/397 |
| 6,348,093 B1 | * | 2/2002 | Rieder et al. ................ 106/724 |
| 6,550,362 B1 | | 4/2003 | Galinat et al. ............ 366/151.1 |

* cited by examiner

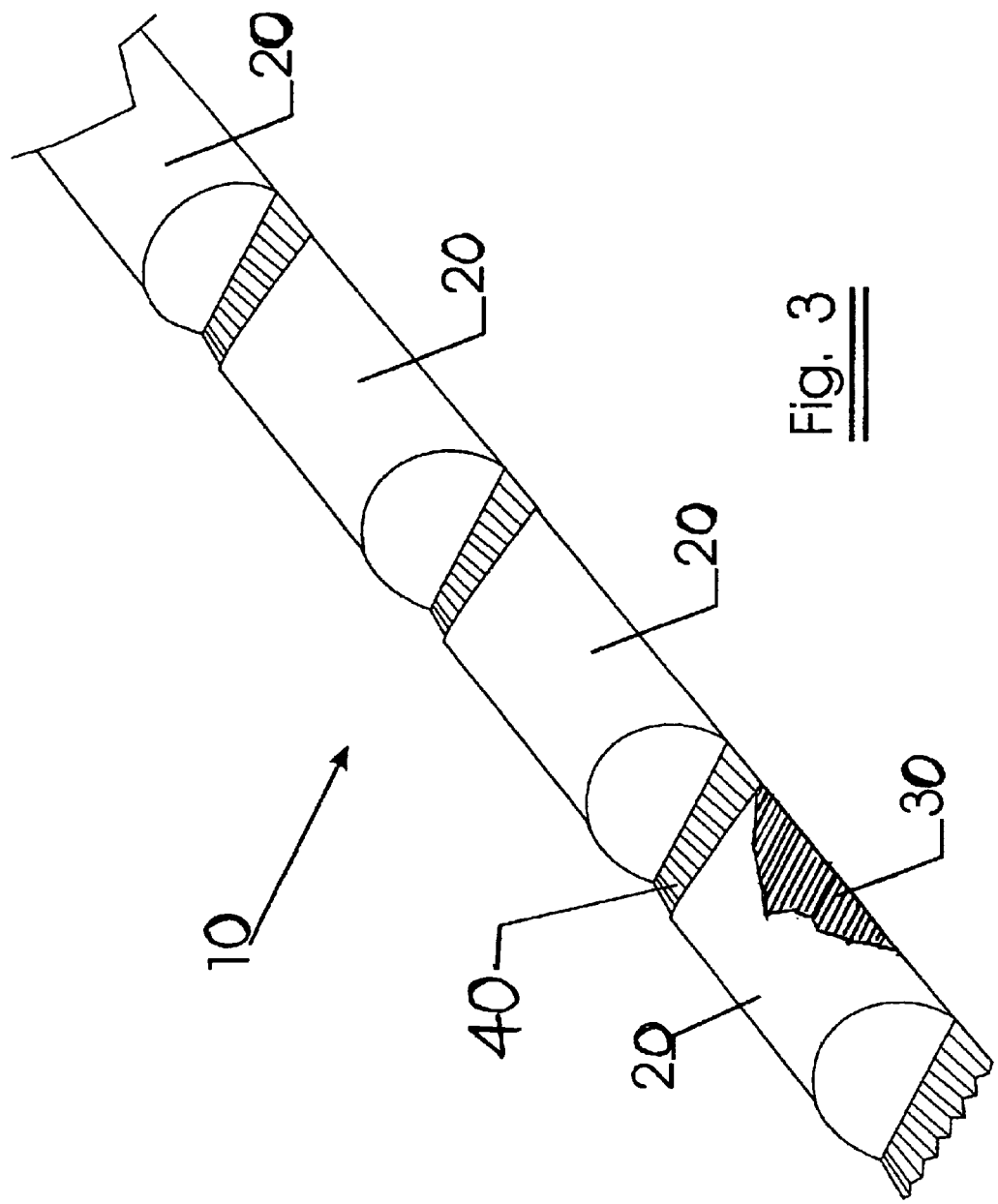

METHOD FOR DOSING REINFORCING FIBRES FOR THE MANUFACTURING OF FIBRE CONCRETE AND THE CHAIN PACKING USED

CROSS-REFERENCE TO RELATED APPLICATIONS

This application is a continuation of U.S. application no. PCT/EP02/04566, filed Apr. 24, 2002, which U.S. application no. PCT/EP02/04566 claims the priority of Belgium application no. 2001/0309, filed May 4, 2001, and each of which is incorporated herein by reference.

This application relates to Applicant's concurrently filed co-pending application entitled "Closed Reinforcement Fiber Package, As Well As Chain Packing Consisting Of Such Closed Packages" (Applicant's ref. no. 7330), which is a continuation of U.S. application no. PCT/EP02/02455, filed Mar. 5, 2002, and which U.S. application no. PCT/EP02/02455 claims the priority of Belgium application no. 2001/0309, filed May 4, 2001.

BACKGROUND OF THE INVENTION

The invention relates to a method for dosing reinforcing fibres in a mixing silo during the manufacturing of fibre concrete.

For the manufacturing of fibre concrete or concrete reinforced with reinforcing fibres it is extremely important to supply the exact quantity of reinforcing fibres to the mixture of components of mortar or concrete. It is possible to store the different components or ingredients of the concrete to be manufactured in separate silos and to supply the exact quantity of each of these components to the mixing silo.

The supply of the exact quantity of reinforcing fibres, such as steel fibres, is extremely difficult. This is certainly the case when the mixture is made on the building yard itself.

Numerous solutions have already been proposed, such as in EP-A-522.029 (WO 91/14551); EP-A499.572; AP-A499.573; DE 29714704U; DE-A-3.412.216; DE-A4.427.156; FR-A-2.672.045 and many other patent documents.

A disadvantage of the known solutions is that they all need a rather complex dosing machine or weighing machine.

Another disadvantage is that the weighing or dosing of reinforcement fibres in a concrete mixing plant or on a building yard is a cumbersome and time-consuming operation.

SUMMARY OF THE INVENTION

The invention intends to avoid the aforementioned disadvantages.

Therefore, the invention proposes for a method mentioned in the opening lines that the reinforcing fibres are supplied in a chain packing of sacks made of a material that can be disintegrated in mortar or concrete.

It has to be noted that it is already known to pack the reinforcing fibres in sacks that can be disintegrated in mortar or concrete. This has amongst others already been described in DE-A4.214-540 and WO 95/11861.

An important variant of the method according to the invention is characterised in that the reinforcing fibres are supplied in a chain packing of sacks, that the sacks are cut open above the mixing silo as a result of which the reinforcing fibres fall in the mixing silo and that the empty chain packing is conveyed away.

In the latter case, the sacks can be made of a material that cannot be disintegrated in mortar or concrete. The removal of the empty chain packing can be assured by a known roll system.

In a preferred method according to the invention, the sacks are joined to each other.

The great advantage of the method according to the invention is that the reinforcing fibres are now supplied to the mixing silo in a continuous chain packing of sacks. It is now possible to supply a correct, well-defined quantity of reinforcing fibres in the sacks during the manufacturing of the reinforcing fibres. This makes it possible to supply the exact quantity of reinforcing fibres to the mixing silo by means of a conveyor belt, a roll system or a similar alimentation device, in which the former dosing or weighing operations are replaced by a measuring operation of the length of the continuous chain packing or a counting operation of the number of supplied sacks to the mixing silo.

By fibre concrete, we understand all curing materials, provided with reinforcing fibres, such as steel fibres, glass fibres and synthetic fibres, such as polypropylene fibres to improve the properties of the curable material.

BRIEF DESCRIPTION OF THE DRAWINGS

The invention will be further explained in the following description by means of the accompanying drawing.

In the drawing,

In the drawing,

FIG. 3 shows a chain packing.

DETAILED DESCRIPTION

Figure 1:
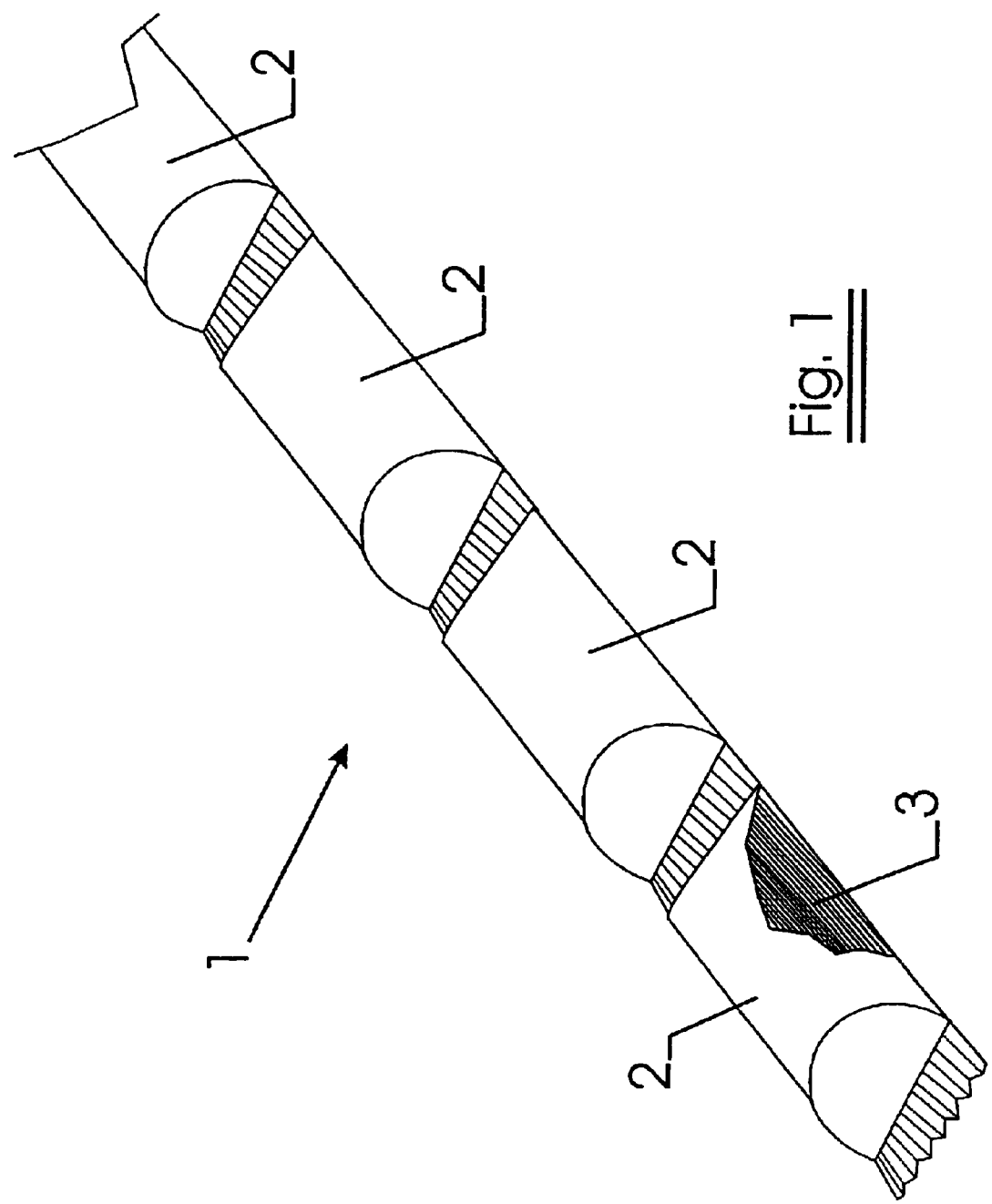
FIGS. 1 and 2 give a representation, both schematically and in perspective, of parts of the chain packing according to the invention.

In FIG. 1, the chain packing or chain package applied according to the method according to the invention is generally indicated by 1. The chain packing or package 1 consists of a large number of sacks 2 that are joined together. The sacks 2 may be made of a material that can be disintegrated in mortar or concrete.

As already mentioned above, it is already known to mix ingredients in concrete, stored in sacks, such as e.g. cellulose, which disintegrate in water. Preferably, a cellulose-based foil is used for the sacks 2; such foil will also be used as basic material for paper, possibly, such as known in the paper branch of industry, with addition of water-soluble glue and fillers, which are harmless to the concrete. The sacks can e.g. be glued together and closed with water-soluble heat-adhesive. But it is clear that every foil that disintegrates in the concrete water within the usual mixing time can be used.

It is also possible to manufacture the sacks 2 of the chain packing 1 in a material that cannot be disintegrated in mortar or concrete. In that case, the sacks 2 are cut open above the mixing silo by means of a known cutting device as a result of which the reinforcing fibres 2 fall in the mixing silo. The continuous empty chain packing 1 is then conveyed by means of a known roll system. The advantage of this method consists in the fact that no chain packing 1 material falls in the mixing silo.

In FIG. 1, the reinforcing fibres, packed in the sacks 2, are indicated by 3. The reinforcing fibres 3 can be made of all sorts of material's. This depends on the demands required of the fibres and on the fibre concrete to be reinforced.

Preferably, steel reinforcing fibres 3 are used, sold amongst others by the applicant N. V. Bekaert S. A. under the brand name DRAMIX. Mostly, steel fibres 3 are used with a tensile force comprised e.g. between 500 and 3000 N/mm$^2$.

The used fibres can e.g. be straight. This is the simplest and cheapest version of reinforcing fibres that can be used for reinforcing. Preferably, the reinforcing fibres have a form that makes it rather difficult to pull them out of the cured concrete material using a tensile strain. To that end, the fibres are e.g. corrugated or their cross-section-surface varies along the length. For steel fibres, the thickness or diameter preferably varies from 0.15 to 1.2 mm. The length-diameter ratio for steel fibres is, for practical and economical reasons, mostly situated between 10 and 200 and preferably minimally amounts to 40. For non-straight fibres, the length is the rectilinear distance between the ends of the fibres, whereas the diameter of fibres of which the diameter varies along the length is defined as the average diameter over the entire length.

As FIG. 1 shows, the reinforcing fibres 3 are preferably situated in a mainly mutually parallel position in the sack 2. In the event of steel fibres, the weight of the total number of fibres per sack 2 varies between 100 grams and 2 kg. It is also possible to use without any problems sacks weighing more than 2 kg.

The packing and weighing of steel fibres, such as described above, can be executed in line with the actual production of the steel fibres or on another spot, separated from the actual manufacturing of the steel fibres. It is e.g. possible to place the steel fibres 3 in a mainly mutual parallel position by means of magnetic forces.

Preferably, the length of the steel fibres 3 is practically identical to the length of the sack 2 and the steel fibres 3 are situated lengthwise the sack 2. The chain packing 1 preferably consists of sacks 2 that are joined in line. It is also possible to make sure that the length of the steel fibres 3 is practically identical to the width of the sacks 2 and that the fibres 3 are situated widthwise the sack 2.

Figure 2:
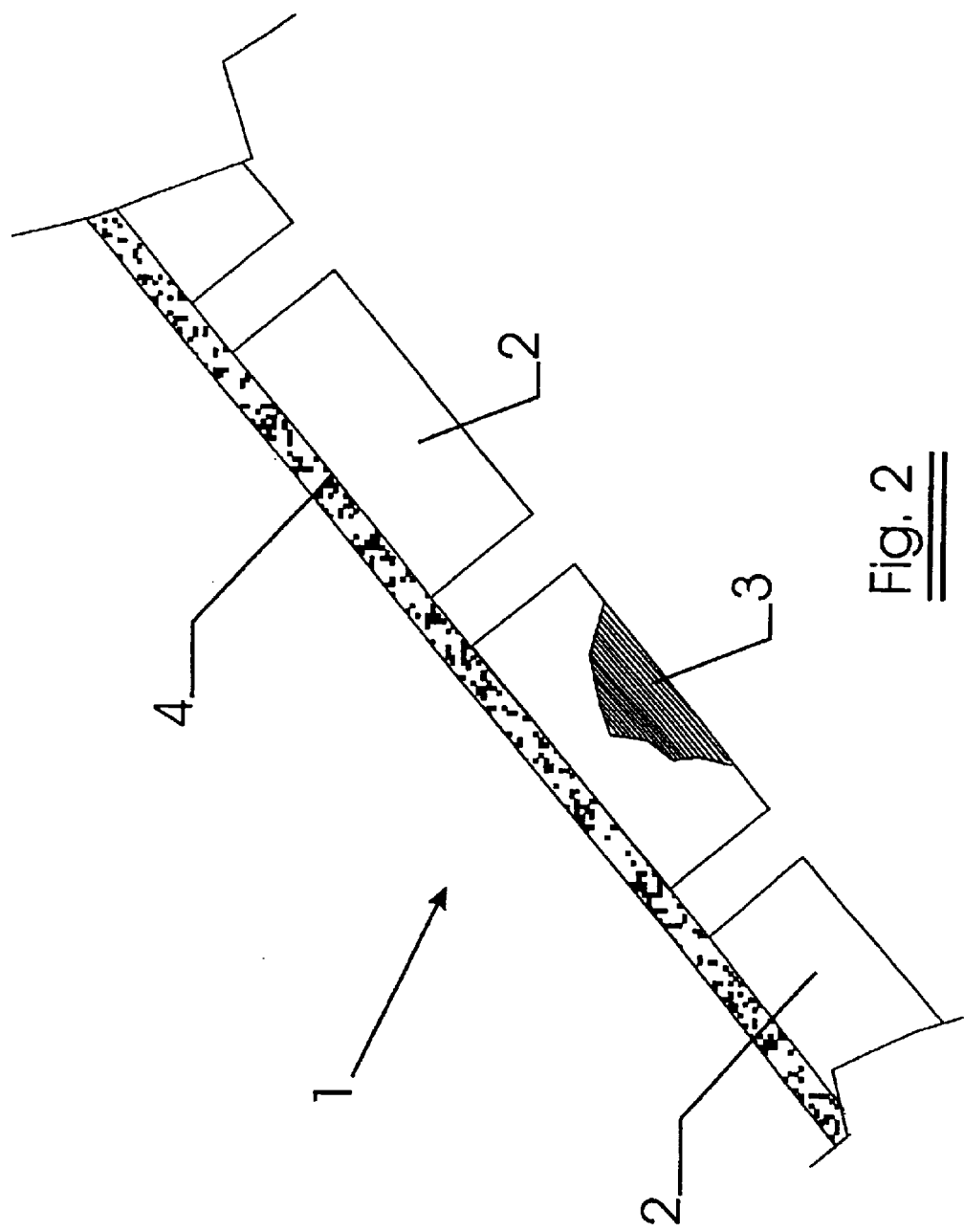

FIG. 2 shows a chain packing 1, whereby the sacks 2 with one side thereof are connected to a tape or strip 4. The strip 4 can also be a wire, a cord or the like. The strip 4 can be made of a material that can be disintegrated in mortar or concrete to be reinforced.

It is obvious that the chain packing 1 according to the invention makes it now possible to easily supply such continuous packings 1 to the mixing silo by means of simple means of transportation, such as a conveyor belt, allowing in a simple way by means of a counter to count the number of sacks 2 or by means of a simple measuring device to measure the length of the supplied chain packing in order to easily define the supplied weight of reinforcing fibres 3 to the mixing silo.

FIG. 3 shows a chain packing 10, wherein packages or sacks 20 contain reinforcing fibers 30 having lengths corresponding to the widths of sacks 20. Sacks 20 are connected on one side thereof to a tape or strip 40. The strip 40 can be replaced by a wire, a cord, and the like. The strip 40 is made of a material disintegrable in the concrete to be reinforced.

What is claimed is:

1. A method for dosing reinforcing fibers in a mixing silo during manufacturing of fiber concrete, comprising:
   a) supplying the fibers in a continuous chain packing of sacks, the sacks being joined to each other;
   b) cutting open the sacks a sufficient amount and above the mixing silo so that the reinforcing fibers fall out of the sacks into the mixing silo; and
   c) conveying away the cut open continuous empty chain packing.

2. Method as in claims 1, wherein:
   a) the reinforcing fibers are arranged in the sacks in a substantially mutually parallel position.

3. Method as in claim 1, wherein:
   a) a length of the respective reinforcing fibers corresponds substantially to the respective lengths of the sacks; and
   b) the reinforcing fibers are situated lengthwise in the respective sacks.

4. Method as in claims 1, wherein:
   a) a length of the respective reinforcing fibers corresponds substantially to the respective width of the sacks; and
   b) the reinforcing fibers are situated widthwise in the respective sacks.

5. Method as in claim 1, wherein:
   a) the sacks are joined in a line.

* * * * *